United States Patent
Cardamone et al.

(10) Patent No.: US 7,096,623 B2
(45) Date of Patent: Aug. 29, 2006

(54) FLORAL DESIGN CONTAINER SYSTEM

(76) Inventors: Lisa P. Cardamone, 2006 Quay Village Ct., Unit T1, Annapolis, MD (US) 21403; Peter T. Cardamone, III, 1859 Aurora Ct., Brentwood, CA (US) 94513

( * ) Notice: Subject to any disclaimer, the term of this patent is extended or adjusted under 35 U.S.C. 154(b) by 0 days.

(21) Appl. No.: 11/001,880

(22) Filed: Dec. 2, 2004

(65) Prior Publication Data

US 2005/0204618 A1    Sep. 22, 2005

Related U.S. Application Data

(60) Provisional application No. 60/526,748, filed on Dec. 3, 2003.

(51) Int. Cl.
*A01G 5/04* (2006.01)
*A47G 7/04* (2006.01)

(52) U.S. Cl. .................... 47/41.01; 47/41.11
(58) Field of Classification Search .......... 47/41.01, 47/41.12, 41.11
See application file for complete search history.

(56) References Cited

U.S. PATENT DOCUMENTS

| | | | |
|---|---|---|---|
| 254,006 A * | 2/1882 | Hake ................. | 47/41.11 |
| 903,227 A | 11/1908 | Pruden | |
| D51,081 S | 7/1917 | Rinken | |
| D75,653 S | 6/1928 | Sanford | |
| 1,693,372 A | 11/1928 | Denman | |
| 1,725,373 A | 8/1929 | Rosenwald | |
| 1,965,565 A | 7/1934 | Bartlett ................. | 47/41 |
| 1,973,868 A | 9/1934 | Field ................. | 47/41 |
| 1,989,952 A | 2/1935 | Thomas ................. | 47/41 |
| 2,057,537 A | 10/1936 | Oshiro ................. | 47/41 |
| 2,577,251 A | 12/1951 | King ................. | 47/41 |
| 2,686,989 A | 8/1954 | Dillon et al. ................. | 47/41 |
| 2,700,848 A | 2/1955 | Reynolds ................. | 47/41 |
| 2,747,333 A | 5/1956 | Erbguth ................. | 47/41 |
| 2,874,267 A | 2/1959 | Shipley ................. | 240/2 |
| 2,876,587 A | 3/1959 | Saks et al. ................. | 47/41 |
| 2,900,760 A * | 8/1959 | Tupper ................. | 47/41.11 |
| 2,929,171 A | 3/1960 | Josephson ................. | 47/41 |
| D196,926 S | 11/1963 | Swett ................. | D35/3 |
| 3,183,624 A * | 5/1965 | Swett ................. | 47/41.11 |
| 3,745,702 A | 7/1973 | Ogawa ................. | 47/41.13 |
| D230,408 S | 2/1974 | Persson-Melin ......... | D29/28 R |
| 4,461,118 A | 7/1984 | Fertig ................. | 47/41 R |
| 4,958,461 A * | 9/1990 | Aldrich ................. | 47/41.01 |
| D322,487 S | 12/1991 | Kazanowski ................. | D26/10 |
| 5,127,184 A | 7/1992 | Cosentino ................. | 47/41.01 |

(Continued)

FOREIGN PATENT DOCUMENTS

FR     2236409     *    3/1975

(Continued)

Primary Examiner—Son T. Nguyen
(74) Attorney, Agent, or Firm—Whiteford, Taylor & Preston; Jeffrey C. Maynard (57) ABSTRACT

A floral design system is described having a base that is utilized to house water when displaying live flowers. A lid is designed to fit within the base and has a series of openings about its surface. A series of sleeves with a flap attachment configuration comprising upper and lower ridges are attached to the lid through the openings. The sleeves provide openings through which the stems of the flowers are passed to be held firmly in place. The sleeves are made out of a pliable material for conforming to the shape of the stem while providing a tight fit. The bottom of the stems protrudes down into the base for water supply.

11 Claims, 8 Drawing Sheets

U.S. PATENT DOCUMENTS

| | | | |
|---|---|---|---|
| 5,225,342 A * | 7/1993 | Farrell | 435/430 |
| 5,301,463 A | 4/1994 | Domurat | 47/41.01 |
| 5,375,370 A | 12/1994 | Zimmerman | 47/41.01 |
| 5,380,568 A | 1/1995 | Banschick | 428/4 |
| 5,570,785 A | 11/1996 | Honkawa | 206/423 |
| 5,645,168 A | 7/1997 | Honkawa | 206/423 |
| 5,683,762 A | 11/1997 | Banschick | 428/4 |
| 5,758,452 A | 6/1998 | Matteucci et al. | 47/41.01 |
| 5,943,820 A | 8/1999 | O'Connell | 47/41.12 |
| 6,145,245 A | 11/2000 | Honkawa et al. | 47/41.01 |
| 6,161,333 A | 12/2000 | Poston | 47/86 |
| 6,189,261 B1 | 2/2001 | Helgeson | 47/41.11 |
| 6,474,266 B1 | 11/2002 | Arnett | 119/256 |
| D491,098 S | 6/2004 | Buzzelli | D11/154 |
| 2004/0134124 A1 | 7/2004 | Fenwick | 47/66.1 |

FOREIGN PATENT DOCUMENTS

| | | |
|---|---|---|
| JP | 2001353053 A * | 12/2001 |
| JP | 2004154084 A * | 6/2004 |
| WO | WO 2004071253 A1 * | 8/2004 |

* cited by examiner

FLORAL DESIGN CONTAINER SYSTEM

CROSS REFERENCE TO RELATED APPLICATION

This application is based upon and claims benefit of co-pending U.S. Provisional Patent Application Ser. No. 60/526,748 entitled "Flower Patch Design Containers", filed with the U.S. Patent and Trademark Office on Dec. 3, 2003 by the inventors herein, the specification of that is incorporated herein by reference.

BACKGROUND OF THE INVENTION

1. Field of the Invention

The present invention relates to a plant container system. More specifically, the invention relates to a system to enable a user to create a decorative floral display for use as a centerpiece.

2. Background of the Prior Art

Holders for floral arrangements and other items requiring moisture are known in the art. Most holders for floral arrangements are constructed to receive a foam block into which the stem of a flower can be inserted. Various shapes of the foam block can be used to create different arrangements of flowers. Generally, the flower stems are placed into the foam in a desired orientation. If the stem is not strong enough to penetrate the floral foam, the flower may be attached to a wooden or plastic stick, usually by means of wire or tape.

Often, it also is desired to include flowers in a holder so that the flowers extend at an angle relative to other flowers that are inserted into and vertically extend from the surface of the foam block in the holder. It is often desirable to have the flowers over both the flat top and the sloping portions and, preferably, drape over the upper portions of the vertical sides of the floral foam block. With the prior art holders in which the sides of the blocks extend only vertically, it is difficult, and requires skill, to insert the stems of the flowers into a side of the block and provide a good appearance as well as to cause the flowers to present a cascade effect. With a block having only horizontal and vertical surfaces, the stems of flowers that are to extend at an angle relative to the vertically extending flowers generally are inserted at an angle offset from the orthogonal to the top surface of the foam block and into the vertical side surfaces of the block. The insertion of stems into a foam block at a non-orthogonal angle to its top surface, in addition to the difficulties set forth, does not always result in secure retention of those stems in the block.

Many attempts have been made to simplify the design and display of floral arrangements. For example, U.S. Pat. Nos. 1,965,565; 1,973,868; and 1,989,952, issued to Bartlett, Field, and Thomas, respectively, disclose flower-holding devices. U.S. Pat. No. 2,577,251, issued to King, discloses a flower holder that is designed to hold cut flowers, regardless of the length or diameter of the stem.

U.S. Pat. No. 5,301,463, issued to Domurat, discloses a floral stand designed to display flower or branch arrangements in any desired orientation, including horizontally or upside down. The stand is a hollow shell made of a lightweight plastic material and formed in any pleasing shape desired for flower display. Inside the shell are located airtight compartments for holding liquid nutrient. Each compartment includes a hole for the insertion of a flower stem into it and means to grip the stem tightly.

It is also common to include a candleholder with the flower-arranging device. For example, U.S. Design Pat. No. 332,487, issued to Kazanowski, U.S. Pat. No. 5,645,168, issued to Honkawa, and U.S. Pat. No. 903,227, issued to Pruden, each show a combination flower holder and candleholder.

While each of the above-mentioned devices may be effective to some degree in assisting a user in creating a pleasing floral arrangement, none of the references, however, disclose a compact and inexpensive container system using flexible sleeves attached to a specially designed lid to hold flowers at a variety of angles. None of the references disclose an alternative to the use of floral foam to hold flower stems in a desired arrangement.

SUMMARY OF THE INVENTION

The present invention provides a solution to the above and other problems by enabling a simply designed, easy to construct, and simple to use floral display system.

It is, therefore, an object of the present invention to enable a floral design container system that avoids the disadvantages of the prior art.

The present invention comprises a series of containers designed to hold floral stems, greenery, (live, dried or artificial), and/or decorative picks as well as a candle or candles in an arranged pattern. This system also gives the option of displaying objects within the arrangement. These containers come in various shapes and sizes. The container's shape would dictate the various arrangements that can be made in with each container. The structural concept of apertures and sleeves is how the stems or picks are held in place. Each system consists of: a base, a lid, a unit base, Floral Arranging Units, a wax catcher, and a candleholder or candleholders, the number and type, (ex. Tapered or pillar candles) of candleholders depends on the size and shape of each container). This system also has accessories that include a docking feature and Versatility Feature. Each container can be made of either transparent or opaque materials or an incorporation of both transparent and opaque materials. All examples of the containers are shown in a round shape with a candleholder that would hold a tapered candle.

BRIEF DESCRIPTION OF THE DRAWINGS

The above and other features, aspects, and advantages of the present invention are considered in more detail, in relation to the following description of embodiments thereof shown in the accompanying drawings, in that.

DETAILED DESCRIPTION OF THE INVENTION

The invention summarized above and defined by the enumerated claims may be better understood by referring to the following description, which should be read in conjunction with the accompanying drawings in which like reference numbers are used for like parts. This description of an embodiment, set out below to enable one to build and use an implementation of the invention, is not intended to limit the enumerated claims, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

The invention is a centerpiece/floral holder. The holder comprises a base that is utilized to house water when displaying live flowers. A lid is designed to fit within the base and has a series of openings about its surface. A series of sleeves with a flap attachment configuration comprising upper and lower ridges are attached to the lid through the openings. The sleeves provide openings through which the stems of the flowers are passed to be held firmly in place. The sleeves are made out of a pliable material for conforming to the shape of the stem while providing a tight fit. The bottom of the stems protrudes down into the base for water supply. The lid of the holder includes a circular aperture that serves as a means for replenishing the water supply in the base and for adding an optional candleholder member. An optional outer base having a diameter larger than the inner base is tailored to receive the first base within its inner cavity. The outer base allows the user flexibility in decorating the entire holder.

Figure 1:
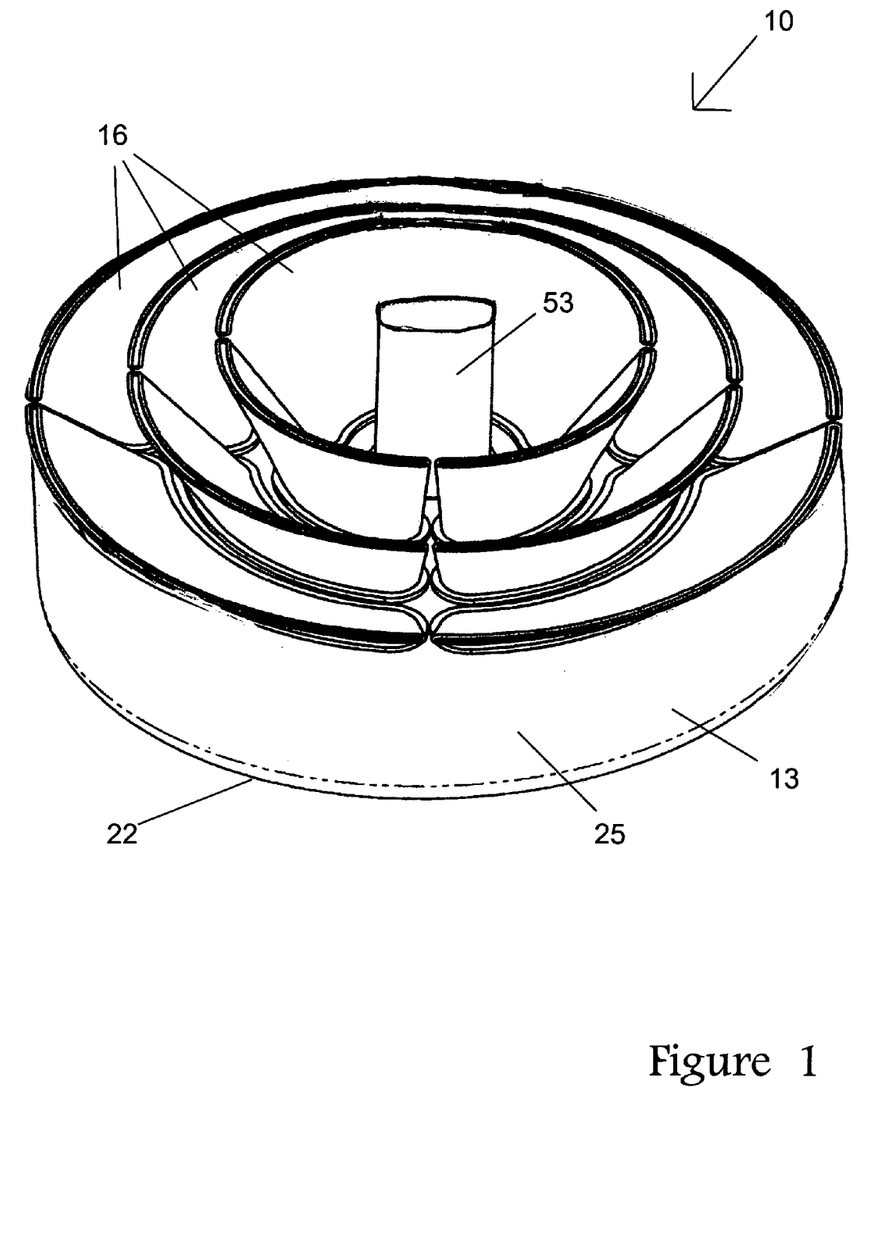
FIG. 1 illustrates an isometric view of a floral centerpiece device according to one embodiment of the present invention.
Figure 2:
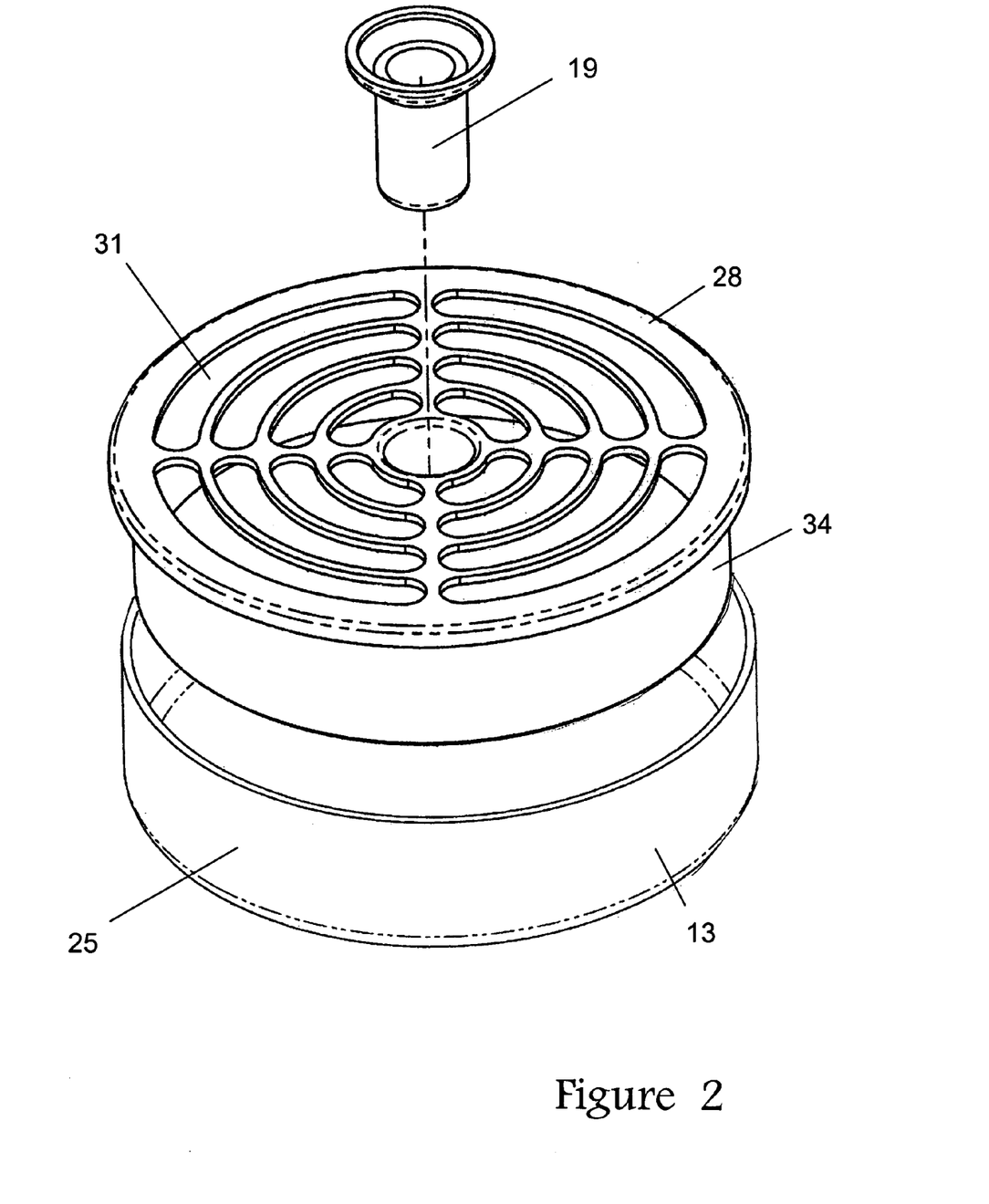
FIG. 2 illustrates a portion of the floral centerpiece device showing the lid unit.

Referring to the drawings, a floral design container system according to the present invention, indicated generally as 10 comprises a base 13, a lid 28, one or more sleeves 16, and optionally a candleholder 19. The base 13 comprises a flat bottom 22 and a peripheral wall 25 creating a shallow, hollow dish for water, stem, or pick containment. Base 13 should be made from water resistant solid material that maintains its shape. The material can be transparent, opaque or a combination of both. The shape of base 13 should correspond with the shape of lid 28. The lid 28 has a generally rigid, flat or convex domed surface having a plurality of apertures 31 therein. Such apertures 31 may be arranged symmetrically around a central location on the lid 28. An inner alignment wall 34 extends downward and substantially perpendicular from the bottom of the lid 28. The inner diameter of the peripheral wall 25 of base 13 should be slightly larger than the exterior diameter of the alignment wall 34, in order to create a snug fit between the peripheral wall 25 of base 13 and the alignment wall 34 of lid 28, so as to prevent water leakage. The alignment wall 34 also allows a user to place and use the lid 28 in vessels other than the base 13. In an alternate embodiment, the lid 28 can be placed in a mounting post, described below, for arrangement in a vase or other container, if so desired.

The lid 28 is constructed for stem or pick placement and containment. The lid 28 should be made from a water resistant solid material that maintains its shape. The material can be made from either transparent or opaque materials or a combination of both. The lid 28 may contain one or more candleholders 19 that would extend out from the top side of the lid. The candleholder 19 is hollow on the inside and open on the top end (where the candle is inserted) and open on the bottom end (where it is connected to the lid) so it can be used as an outlet to fill the base with water when the container is assembled. If there is more than one candleholder on a lid, at least one should have an open-ended bottom to be used as an outlet for water filling purposes, the others may or may not be sealed on the bottom end. The lid may or may not include candleholders.

Figure 3:
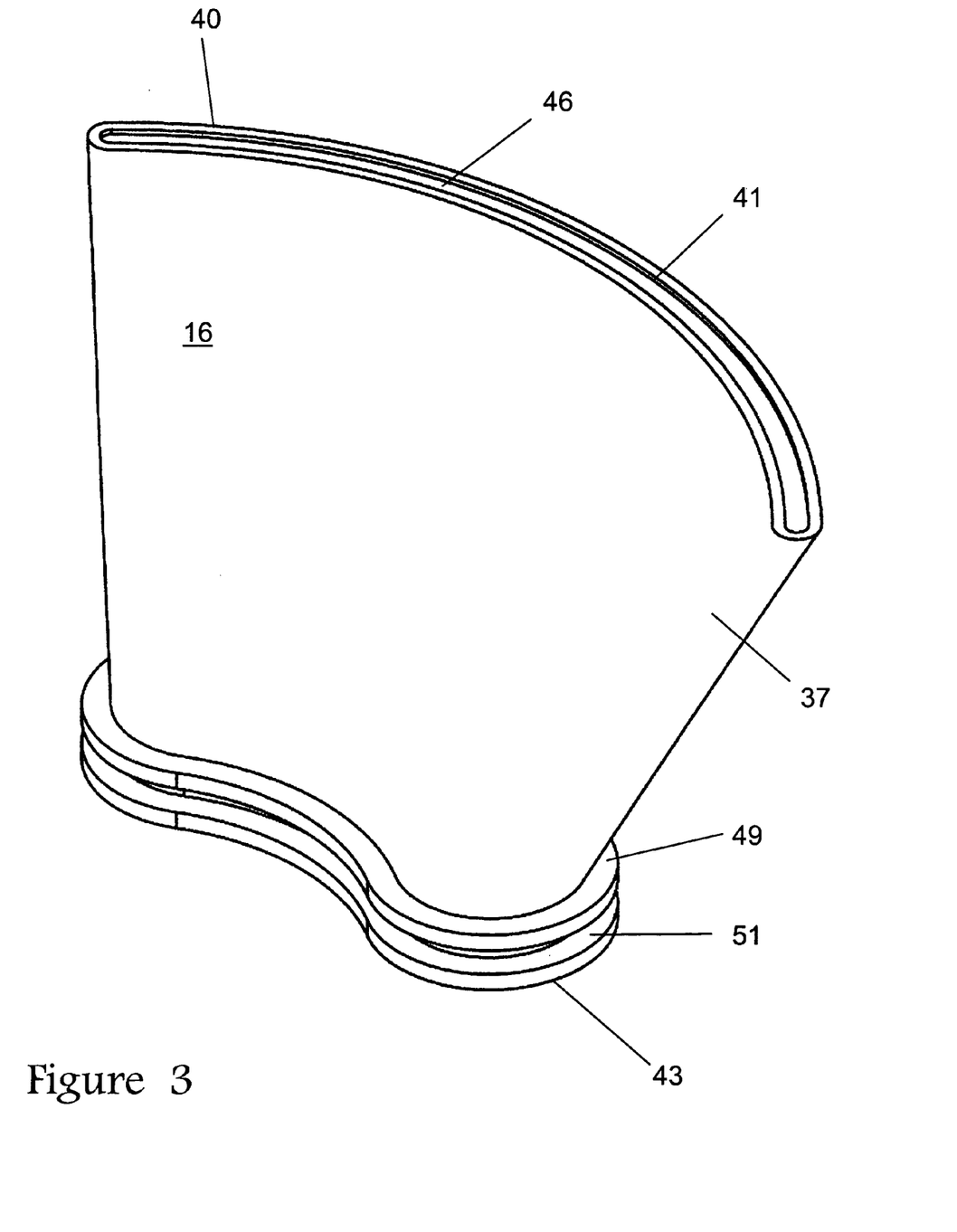
FIG. 3 shows a sleeve for use in the floral centerpiece device of the present invention.

FIG. 3 shows a sleeve 16. The purpose of sleeve 16 is to place the stem of a flower in the display system at a particular angle when the stem is inserted through the sleeve into the container 10. Sleeve 16 can be made from material that is pliable yet firm enough to hold its shape and the angle at which it is formed or from a ridged material that is preformed into a particular shape and angle. The sleeves can vary in shape and design but are always used for the purpose of angle placement and stem or pick containment. At the base of sleeve 16 is an aperture 31 in the lid 28. The sleeve 16 surrounds the perimeter of the aperture 31. The sleeves 16 are formed at various angles and are attached to the lid 28.

In a preferred embodiment, sleeve 16 is made out of material that is pliable, yet firm enough to hold its shape and the angle at which it is formed. The sleeve design has an exterior wall 37 that surrounds the perimeter and encloses an opening. Sleeve 16 has an open top end 40 and an open bottom end 43 and defines a hollow chamber 46 in between the two open ends. When in a resting state the exterior wall 37 collapses on itself, which gives the top protruding end 40 the appearance of having a slit 41 running across its center from the opposing ends of the sleeve 16. When a stem or pick is inserted into the slit 41, it will only open enough to receive the stem or pick into, through the sleeve 16, and out the bottom opening 43 that leads to the base 13. This enables a secure method of holding the stem or pick in place. Each sleeve 16 is formed at a particular angle. Sleeve 16 is attached to the lid 28 by a flap configuration located at the lower end 43 of the sleeve 16. The flap configuration consists of an upper ridge 49 and lower ridge 51. The two ridges 49, 51 are connected to and extend outward from the outside wall 37 of the sleeve 16, surrounding the entire perimeter of the sleeve. In an assembled position, the upper ridge 49 extends from the outer wall 37 and rests on top of the lid 28 and the lower ridge 51 extends outward from the outer wall 37 and presses against the under surface of the lid 28. The distance between the upper ridge 49 and lower ridge 51 corresponds with the thickness of the lid in order to create as tight a fit as possible. The angles, shape, and number of the sleeves 16 vary according to the design of the container.

In an alternate embodiment, inside the perimeter of the exterior wall 37 of sleeve 16 is one or more additional interior walls that run parallel to each other and to the exterior wall. The interior walls have the same height measurements as the exterior wall and their length is approximately the same as the interior of the exterior wall. The thickness of the interior wall is not necessarily the same thickness as the exterior wall. The interior wall is attached to or are formed from the opposing ends of the exterior wall 37 and run the length of the interior of the sleeve 16. When in a resting state, the interior walls collapse into each other, which give the top protruding end 40 the appearance of having a series of slits. When a stem or pick is inserted into one of the slits, it will only open enough to receive the stem or pick into, through the sleeve 16, and out the bottom opening 43 that leads to the base. This enables a secure method of holding the stem or pick in place. In some embodiments, sleeve 16 may be a porous or semi-porous material.

The pattern of apertures 31 on lid 28 can be arranged such that each aperture 31 has a sleeve 16 attached in and around such aperture 31 on a flat or domed surface. Depending on the lid's shape and design, there could also be an aperture situated on the lid's surface that would have a wall surrounding the aperture protruding either upward from the top of the lid or downward from the lid. This would be used as a docking feature 53 that can be used for the placement of various attachments such as a display stand attachment or a variety of other attachments.

Figure 4:
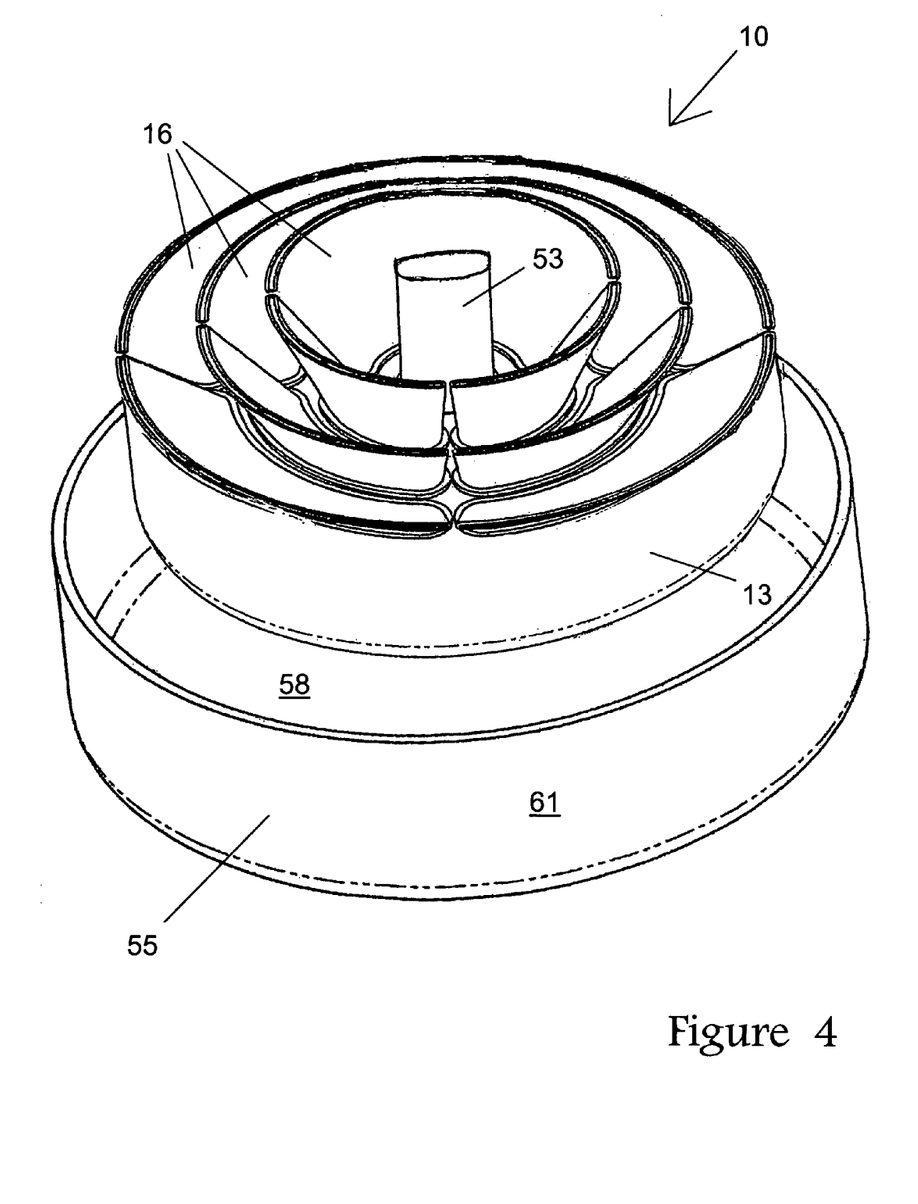
FIG. 4 illustrates an isometric view of a portion of the floral centerpiece device of FIG. 1, with an additional base unit.

Referring to FIG. 4, a unit base 55 comprises a flat bottom 58 and a peripheral wall 61 creating a shallow, hollow dish that is made from water resistant solid material that maintains its shape. The material can be transparent, opaque or a combination of both. The shape of unit base 55 corresponds with the shape of the base 13 and lid 28. The unit base 55 is a container that the floral design container 10 can be placed in. The unit base 55 is hollow and approximately the same shape and height as the base 13 of the floral design container 10 with a substantially larger diameter. The function of unit base 55 is to hold random materials to give the user a variety of looks for their arrangements. This feature also gives the user the option of having their arrangement appear as if it were arranged in various mediums other than water. This is achieved by filling the Unit Base with desired materials and letting them flow over onto the surface of the lid 28.

Figure 5:
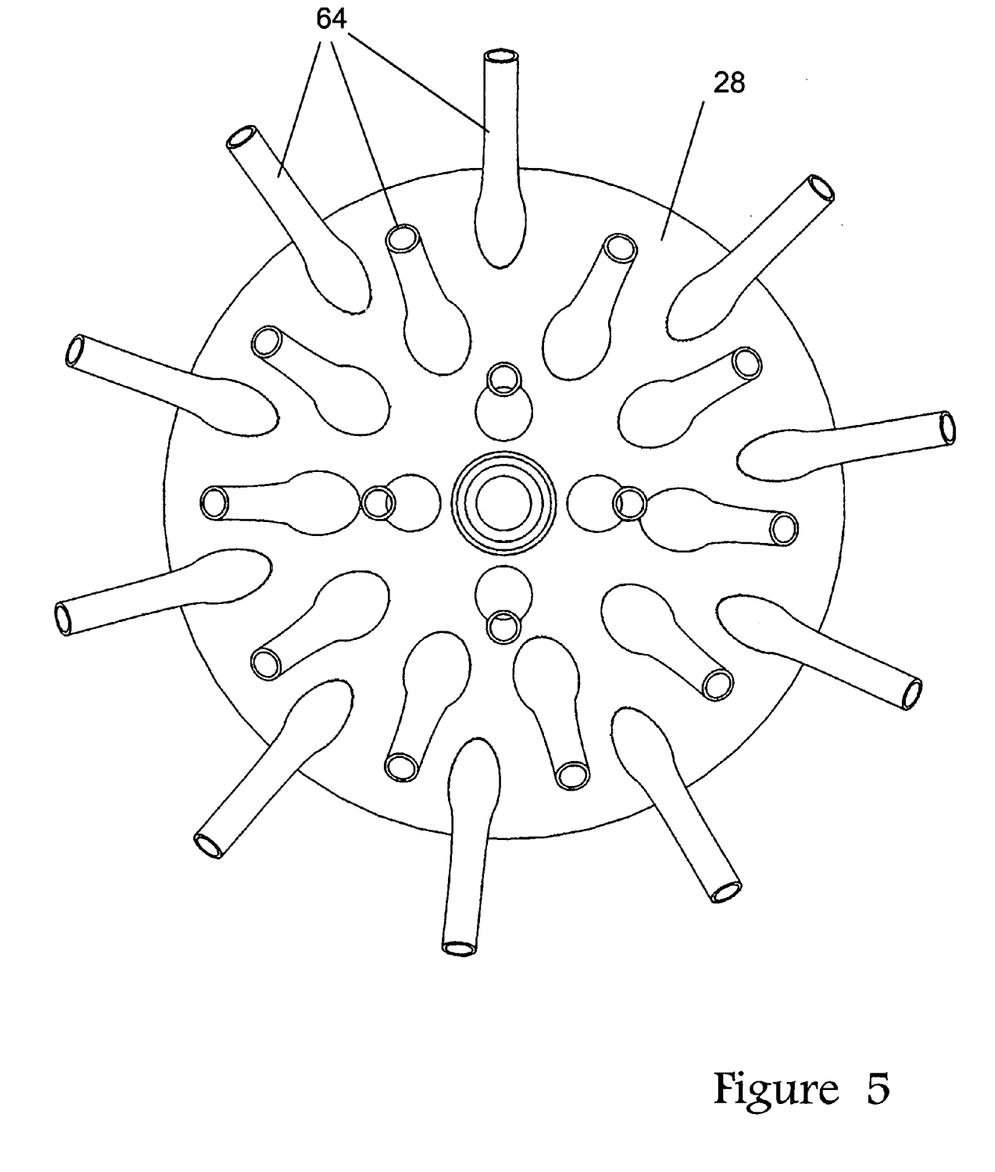
FIG. 5 illustrates a plan view of a floral centerpiece device according to an alternate embodiment of the present invention.
Figure 6:
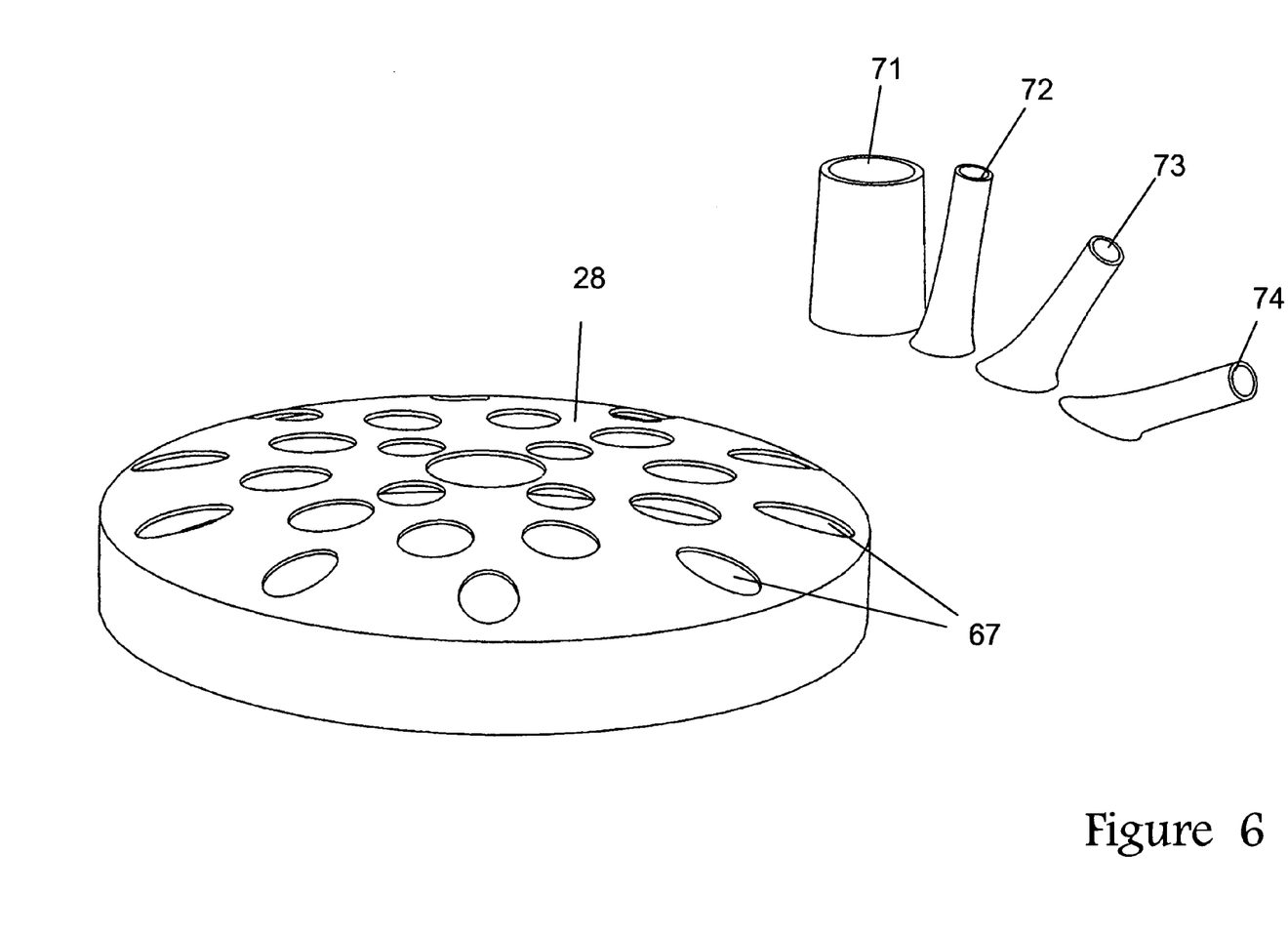
FIG. 6 shows an alternate lid and sleeve arrangement according to the present invention.

In an alternate embodiment as shown in FIGS. 5 and 6, the sleeves are tubular shaped and made out of a rigid material that holds its shape and form. Sleeve 64 has a perimeter wall that encloses the sleeve and is hollow with an open top and bottom end. The sleeve protrudes out from the lid 28 as part of the lid or attached to the lid 28 surrounding a circular or oval shaped aperture 67 on the lid 28. The sleeves are formed having a lower end with various angles such as sleeves 71, 72, 73, and 74 shown in FIG. 6. The angles, shape, and number of the sleeves vary according to the design of the container. Each sleeve 64 is designed to hold a single flower stem.

Figure 7:
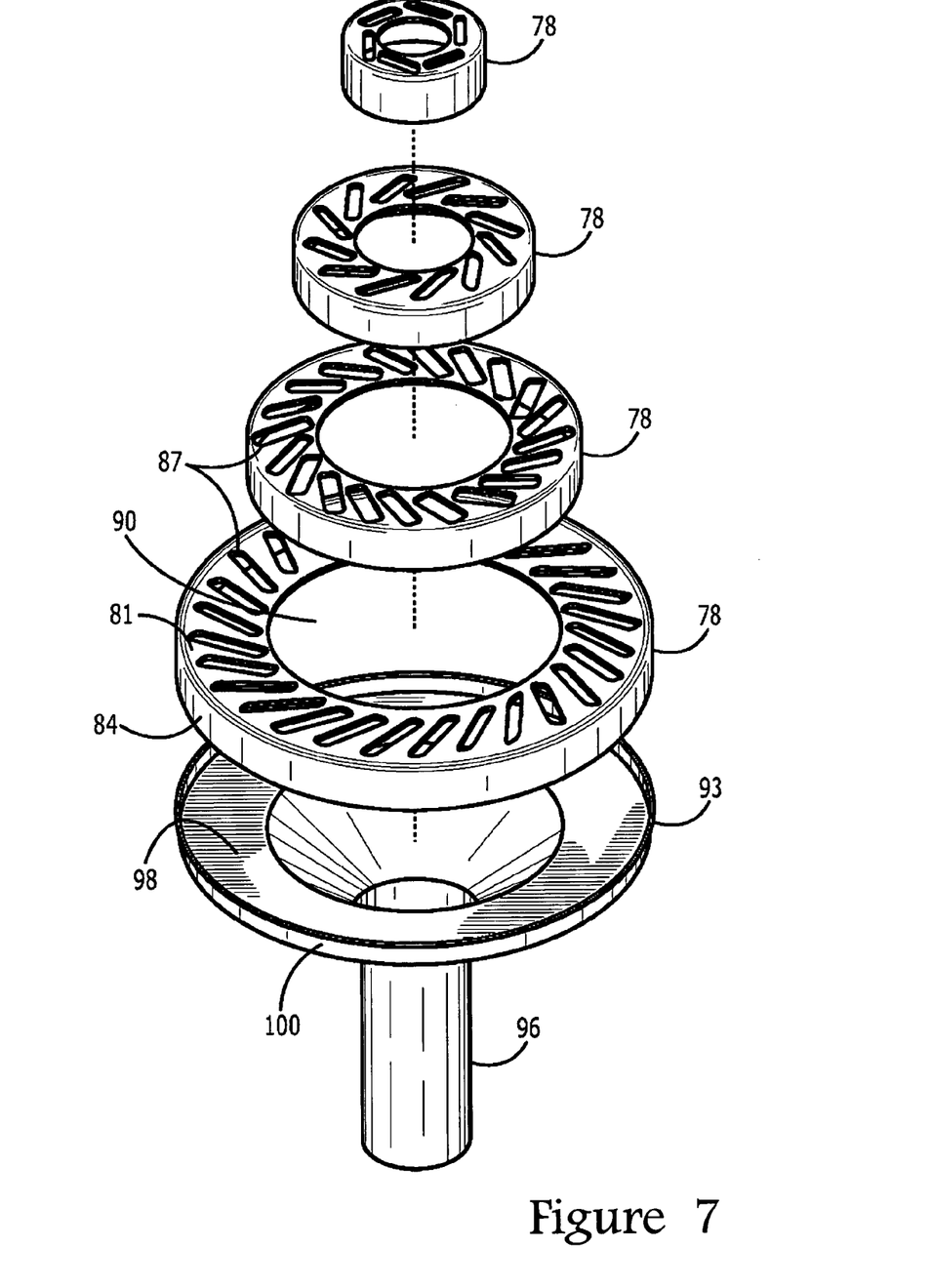
FIG. 7 illustrates an exploded view of a floral centerpiece device according to an alternate embodiment of the present invention.
Figure 8:
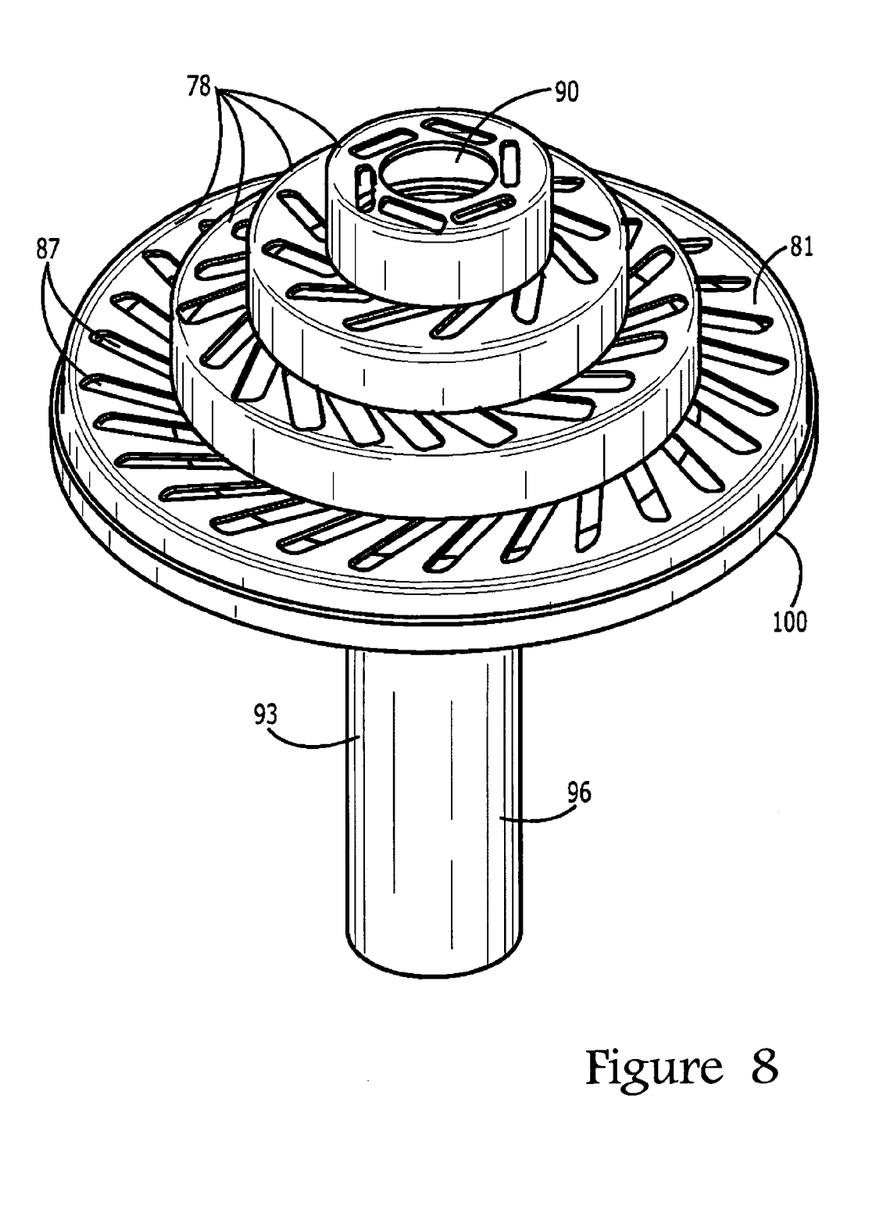
FIG. 8 illustrates an isometric view of the floral centerpiece device of FIG. 7.

In a further alternate embodiment shown in FIGS. 7 and 8, a plurality of floral arranging units 78 of the floral centerpiece design container system can be constructed for stem or pick placement and containment. Each floral arranging unit is similar to the lid 28 described above in graduated sizes. The units are made from water resistant solid material that maintains its shape. The material can be made from either transparent or opaque materials or a combination of both. The units have a top surface 81 and a perimeter wall 84 that extends downward from the surface. The section inside the perimeter wall is hollow. The top surface 81 displays an arranged pattern of apertures 87. The apertures may or may not have sleeves (as described above) attached therein and around them. In the center of each unit 78 is a single large opening 90 that corresponds to the size of the unit, such opening 90 is designed to facilitate passage of flower stems from upper units to lower units. The units 78 come in a variety of shapes and sizes. Each shape has complimentary graduated sizes that enables a user to assemble as small or as large an arrangement as desired by stacking units 78 in a graduated order. The desired size arrangement is achieved by the addition or removal of units. The units 78 are connected by one or more dowels that protrude downward from the bottom surface of the perimeter wall 84. The placement of the dowels corresponds to small openings on the receiving disk's surface 81.

A receiving base 93 comprises a hollow cylinder 96 that graduates into a flat open disk 98 having an upward protruding alignment wall 100 along the perimeter of the disk 98. This structure is made from a firm material that can be either transparent or opaque. The receiving base 93 gives the user an option to use the floral arranging units 78 or the lid 28 from the floral design container system 10 in a variety of vase shapes by placing the floral arranging units 78 or lid 28 onto the receiving base 93 and inserting the cylinder portion 96 into the desired container.

The invention has been described with references to a preferred embodiment. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

What is claimed is:

1. A floral design container system comprising:
    a base, comprising:
        (1) a bottom surface; and
        (2) a base wall around the periphery of said bottom surface;
    a lid, comprising:
        (1) a top surface having a plurality of apertures therein; and
        (2) an alignment wall extending from said lid, the exterior diameter of said alignment wall being sized and configured to fit said base wall; and
    at least one sleeve attached to said aperture, said at least one sleeve comprising:
        (1) an outer walk;
        (2) a lower ridge connected to and extending substantially perpendicular to the outer wall, said lower ridge surrounding the perimeter of the sleeve at the bottom of said sleeve; and
        (3) an upper ridge connected to and extending substantially perpendicular to the outer wall, said upper ridge surrounding the perimeter of the sleeve above said lower ridge
            wherein the distance between said lower ridge and said upper ridge corresponds with the thickness of said lid, and wherein the sleeve is sized and configured to enable a flower stem inserted through said sleeve to be held in place.

2. The floral design system according to claim 1, further comprising:
    a unit base, comprising:
        (1) a bottom surface; and
        (2) a wall around the periphery of said bottom surface;
    wherein the interior diameter of said wall is larger than the exterior diameter of said base wall.

3. The floral design system according to claim 1, further comprising at least one candleholder attached to said lid.

4. The floral design system according to claim 3, wherein said candleholder has at least one opening in the bottom thereof to enable water to be added to said base through said candleholder.

5. The floral design system according to claim 1, said sleeve further comprising an interior wall.

6. A floral display system comprising:
    a base;
    a lid; and
    at least one flexible sleeve attached to and extending upwardly from said lid, said flexible sleeve comprising:
        (1) an outer wall having an open top and bottom forming a hollow chamber, wherein said at least one flexible sleeve is aligned with a cutout in the lid; (2) a lower ridge connected to and extending substantially perpendicular to the outer wall, said lower ridge surrounding the perimeter of the sleeve at the bottom of said sleeve; and (3) an upper ridge connected to and extending substantially perpendicular to the outer wall, said upper ridge surrounding the perimeter of the sleeve above said lower ridge wherein the distance between said lower ridge and said upper ridge corresponds with the thickness of said lid.

7. The floral display system according to claim 6, said base further comprising:
    (1) a bottom surface; and
    (2) a base wall around the periphery of said bottom surface.

8. The floral display system according to claim 7, said lid further comprising:
    (1) atop surface; and
    (2) an alignment wall extending from said lid, the exterior diameter of said alignment wall being sized and configured to fit said base wall.

9. The floral display system according to claim 6, further comprising:
    a unit base, comprising:
        (1) a bottom surface; and
        (2) a wall around the periphery of said bottom surface;
    wherein the interior diameter of said wall is larger than the exterior diameter of said base wall.

10. The floral display system according to claim 6, further comprising at least one candleholder attached to said lid.

11. The floral display system according to claim 10, wherein said candleholder has at least one opening in the bottom thereof to enable water to be added to said base through said candleholder.

\* \* \* \* \*